United States Patent
Joseph et al.

(10) Patent No.: US 11,374,876 B2
(45) Date of Patent: Jun. 28, 2022

(54) INTELLIGENT CLOUD PLATFORM TO HOST RESOURCE EFFICIENT EDGE NETWORK FUNCTION

(71) Applicant: Samsung Electronics Co., Ltd., Suwon-si (KR)

(72) Inventors: Vimal Bastin Edwin Joseph, Bangalore (IN); Karthikeyan Subramaniam, Bangalore (IN); Parvathi Mahesh Hedathri, Bangalore (IN); Peeyus Pal, Bangalore (IN); Karthikeyan Narayanan, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/063,627

(22) Filed: Oct. 5, 2020

(65) Prior Publication Data

US 2021/0105228 A1    Apr. 8, 2021

(30) Foreign Application Priority Data

Oct. 4, 2019   (IN) .............................. 201941040386
Sep. 25, 2020  (IN) .............................. 201941040386

(51) Int. Cl.
*H04L 47/83*    (2022.01)
*H04L 47/72*    (2022.01)
(Continued)

(52) U.S. Cl.
CPC .......... *H04L 47/823* (2013.01); *G06K 9/6256* (2013.01); *G06N 5/04* (2013.01);
(Continued)

(58) Field of Classification Search
CPC .............. H04L 47/823; H04L 41/0893; H04L 41/0896; H04L 41/16; H04L 47/72; G06K 9/6256; G06N 5/04
See application file for complete search history.

(56) References Cited

U.S. PATENT DOCUMENTS 8,856,797 B1 * 10/2014 Siddiqui ................. G06F 11/34
                                                       718/104
10,484,301 B1 * 11/2019 Shukla ................ H04L 41/0896
(Continued)

FOREIGN PATENT DOCUMENTS

| JP | 2012-168585 A | 9/2012 |
| KR | 10-2017-0120335 A | 10/2017 |
| WO | 2016152587 A1 | 9/2016 |

OTHER PUBLICATIONS

Zhang et al. "Proactive VNF Provisioning with Multi-timescale Cloud Resources: Fusing Online Learning and Online Optimization", IEEE Conference on Computer Communications (Year: 2017).*
(Continued)

*Primary Examiner* — Chris Parry
*Assistant Examiner* — Abderrahmen Chouat

(57) ABSTRACT

This disclosure relates to deployment of additional workload in the NFV-MANO to efficiently utilize resources during a lean workload period of Virtual Network Functions (VNFs) associated with an intelligent cloud platform. The method comprises measuring, over a time period, a current resource utilization level of one or more rendered VNFs. Thereafter, forecasting future resource utilization for the time period based on predictive analysis criteria and the current resource utilization level of the one or more VNFs. The method further comprises a machine learning based inference for determining whether the forecast future resource utilization for said time period is less than a determined optimal resource utilization threshold value of the one or more
(Continued)

VNFs. Thereafter, resources of the one or more VNFs to one or more additional workloads are allocated based on the determination of the future resource utilization.

12 Claims, 15 Drawing Sheets

(51) Int. Cl.
    *H04L 41/0893*     (2022.01)
    *H04L 41/16*     (2022.01)
    *G06N 5/04*     (2006.01)
    *G06K 9/62*     (2022.01)
    *H04L 41/0896*     (2022.01)
    *H04L 47/70*     (2022.01)

(52) U.S. Cl.
    CPC ...... *H04L 41/0893* (2013.01); *H04L 41/0896* (2013.01); *H04L 41/16* (2013.01); *H04L 47/72* (2013.01)

(56) References Cited

U.S. PATENT DOCUMENTS

| | | | |
|---|---|---|---|
| 2010/0125845 A1* | 5/2010 | Sugumar | G06F 9/45558 718/1 |
| 2012/0011510 A1 | 1/2012 | Yamakabe et al. | |
| 2014/0282591 A1* | 9/2014 | Stich | G06F 9/50 718/104 |
| 2016/0050161 A1* | 2/2016 | Da | H04L 45/00 709/226 |
| 2017/0208019 A1 | 7/2017 | Shimojou et al. | |
| 2017/0264463 A1* | 9/2017 | Bakos | H04L 12/56 |
| 2017/0279735 A1* | 9/2017 | Yousaf | G06F 9/5083 |
| 2017/0310609 A1* | 10/2017 | Kim | H04L 43/0817 |
| 2018/0225139 A1* | 8/2018 | Hahn | H04L 12/4625 |
| 2018/0246746 A1* | 8/2018 | Miller | G06F 9/45533 |
| 2019/0236439 A1* | 8/2019 | D | G06F 9/5027 |

OTHER PUBLICATIONS

Sudevalayam et al. "Affinity-aware Modeling of CPU Usage for Provisioning Virtualized Applications" IEEE 4th International Conference on Cloud Computing (Year: 2011).*

International Search Report dated Dec. 30, 2020 in connection with International Patent Application No. PCT/KR2020/013500, 3 pages.

Written Opinion of the International Searching Authority dated Dec. 30, 2020 in connection with International Patent Application No. PCT/KR2020/013500, 5 pages.

* cited by examiner

INTELLIGENT CLOUD PLATFORM TO HOST RESOURCE EFFICIENT EDGE NETWORK FUNCTION

CROSS-REFERENCE TO RELATED APPLICATIONS

This application is based on and claims priority under 35 U.S.C. § 119(a) to Indian Patent Application No. 201941040386 (PS) filed on Oct. 4, 2019, and Indian Patent Application No. 201941040386 (CS) filed on Sep. 25, 2020 in the Indian Patent Office, the disclosures of which are herein incorporated by reference in their entirety.

BACKGROUND

1. Field

The present disclosure generally relates for optimization of resources in Network Function Virtualization Management and Network Orchestration (NFV-MANO) architecture operating on a cloud platform. In particular, this disclosure relates to deployment of additional workload in the NFV-MANO to efficiently utilize resources during a lean workload period of a Virtual Network Function (VNFs) associated with an Intelligent cloud platform.

2. Description of Related Art

Network Function Virtualization (NFV) promises ability to scale and adapt to new technology advancement without significant increase in Capital expenditures (CAPEX) and operating expenses (OPEX) for the network operators. NFV reduces the dependencies on proprietary hardware. FIG. 1 illustrates a conventional NFV architecture as per the current state of the art. Network Function Virtualization (NFV) is a network architecture built to run on Commercial Off-The-Shelf (COTS) servers in a virtualized environment. NFV provides network functions like MAC, RLC as Virtual machines on Commercial Off-The-Self (COTS) servers, which forms a part of virtual network functions (VNFs) 101. Network Function Virtualization Infrastructure (NFVI) 105 includes the range of physical resources and their virtualization and supports the execution of the VNFs. NFV Management and Orchestration (MANO) 103 referred as cloud platform allocates, monitors and controls the cloud-computing resources i.e. VNFs.

Generally, VNF is a cluster of multiple Virtual Machines (VMs,) which runs one or more specific functions or processes on top of virtualized infrastructure. Each of these VMs are called VNFC (VNF Component). Capacity handling of VNFs are directly mapped to the number of CPU cores, memory, and storage availability. Accordingly, in order to achieve better performance in virtual environment, an implementation may choose to allocate a static set of resources to VNFs like CPU pinning.

Further, the network functions (NFs) of lower layers of Radio Access Network (RAN), like PHY, MAC, Bearer, and real-time NFs are at peak workload based on the number of users. Thus, the load at a given RAN varies with time and are not loaded around the clock because of user behavior and mobility. Hence, in real-time Network Functions (NFs) may have a workload time with resource usage lesser than that during ideal workload time. This time is termed as the Lean workload period. As can be seen from FIG. 1 VM1, VM2, VM3, VM4, VM5, VM6, VM7 utilizes 70%, 30%, 90%, 20%, 85%, 90%, 50% as an average cloud resource. Among these VMs, the VMs with 30%, 20% & 50% average cloud resource usage for a considerable period contributes for the lean period in the cloud. FIG. 2 shows the VM contributing to lean workload period. Thus, as can be seen from FIGS. 1 and 2 lean workload period of the VMs are not being utilized efficiently.

In the realm of telecom, resources are statically provisioned to meet strict Key Performance Indicator (KPIs) such as latency and throughput. Owing to static resource dimensioning and to secure a stable deployment cost, customers require a static configuration of cloud system resources like CPU, memory and network for VNFs. When these cloud resources are over-provisioned, the VNF will have workloads contributing to both active and lean periods based on user applications requirement (throughput, latency) in the network. In a cloud environment, ad-hoc workloads, for example, vProbe & Diagnostics as shown in FIG. 3 need to be deployed for performance testing, monitoring, diagnostics etc. However, in the current state of the art, MANO and VNFs, cannot achieve high resource utilization because of static mapping of resources.

Thus, from the above there is a need to provide a mechanism that can efficiently forecast the under-utilized static resources and manages the deployment of the additional workloads with optimal resource utilization.

SUMMARY

This summary is provided to introduce a selection of concepts in a simplified format that are further described in the detailed description of this disclosure. This summary is not intended to limit the scope of this disclosure.

This disclosure relates to deployment of additional workload in the NFV-MANO to efficiently utilize resources during a lean workload period of a Virtual Network Function (VNFs) associated with an intelligent cloud platform. The method comprises measuring over a time period, a current resource utilization level of the one or more rendered VNFs. Thereafter, forecasting future resource utilization for the time period based on a predictive analysis criteria and the current resource utilization level of the one or more VNFs. The method further comprises determining whether the forecast future resource utilization for said time period is less than a determined optimal resource utilization threshold value of the one or more VNFs. Thereafter, allocating resources of the one or more VNFs to one or more additional workloads is based on the determination of the future resource utilization.

To further clarify the advantages and features of this disclosure, a more particular description will be rendered by reference to specific embodiments thereof, which is illustrated in the appended drawing. It is appreciated that these drawings depict certain embodiments of this disclosure and are therefore not to be considered as limiting the scope of this disclosure. This disclosure will be described and explained with additional specificity and detail with the accompanying drawings.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Figure 1:
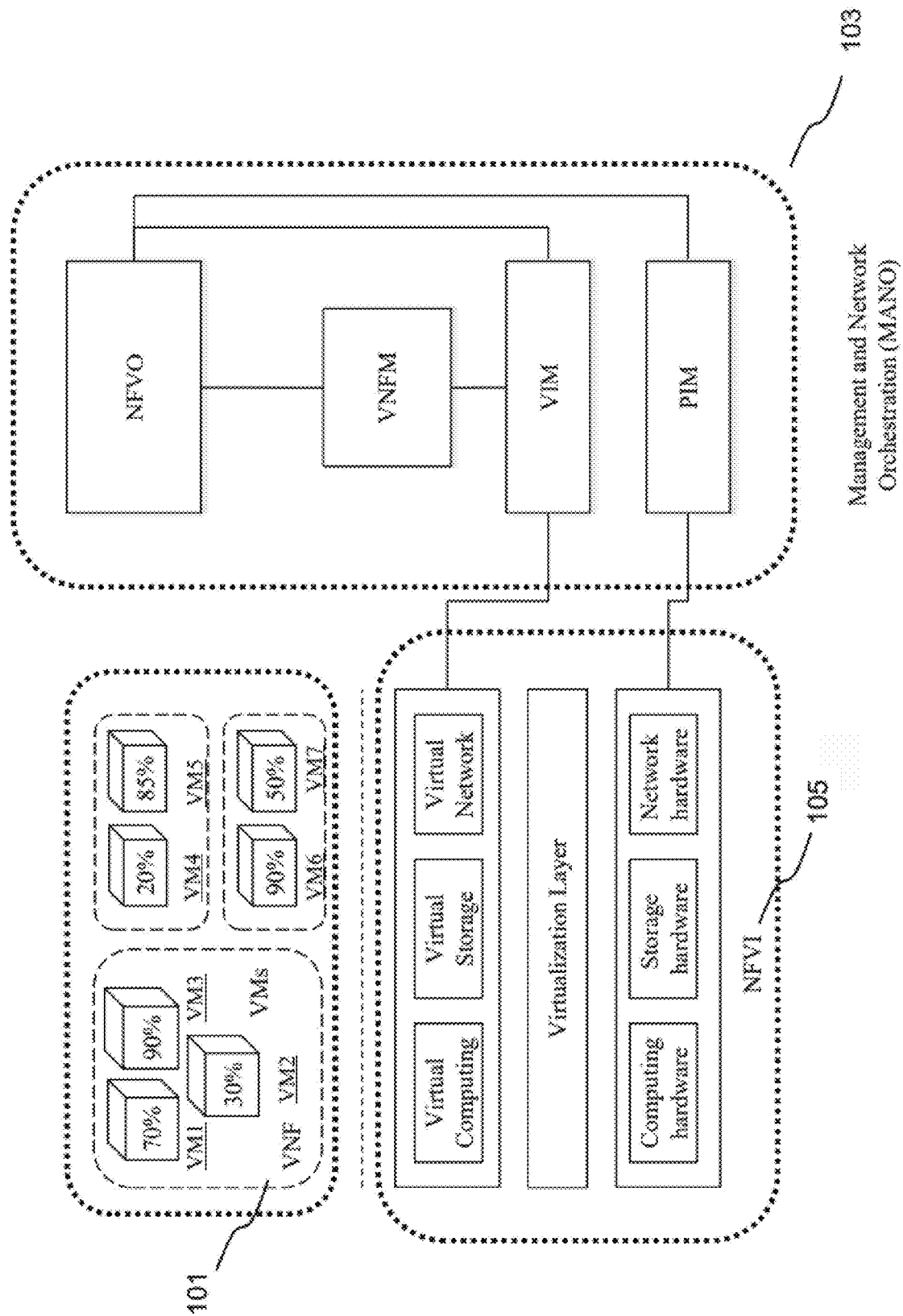
FIG. 1 illustrates a conventional NFV architecture as per the current state of the art.
Figure 2:
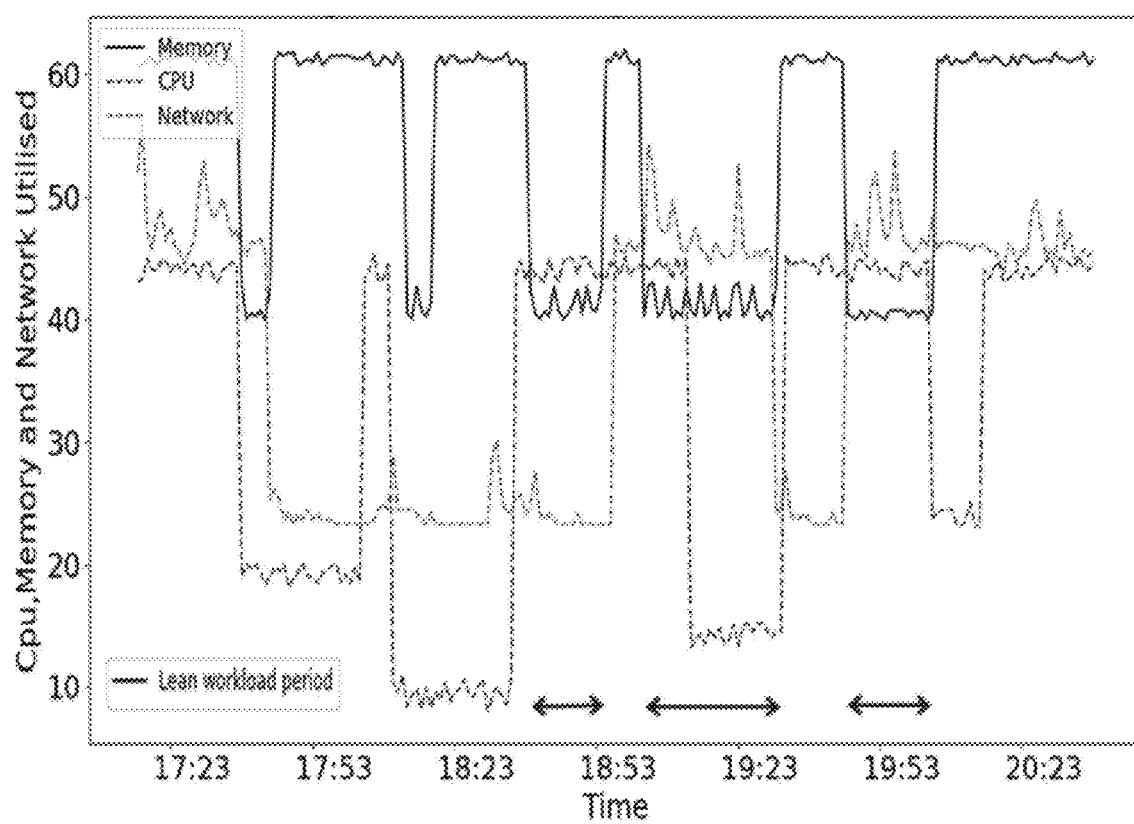
FIG. 2 illustrates VM contributing to lean workload period as per the state of the art technique.
Figure 3:
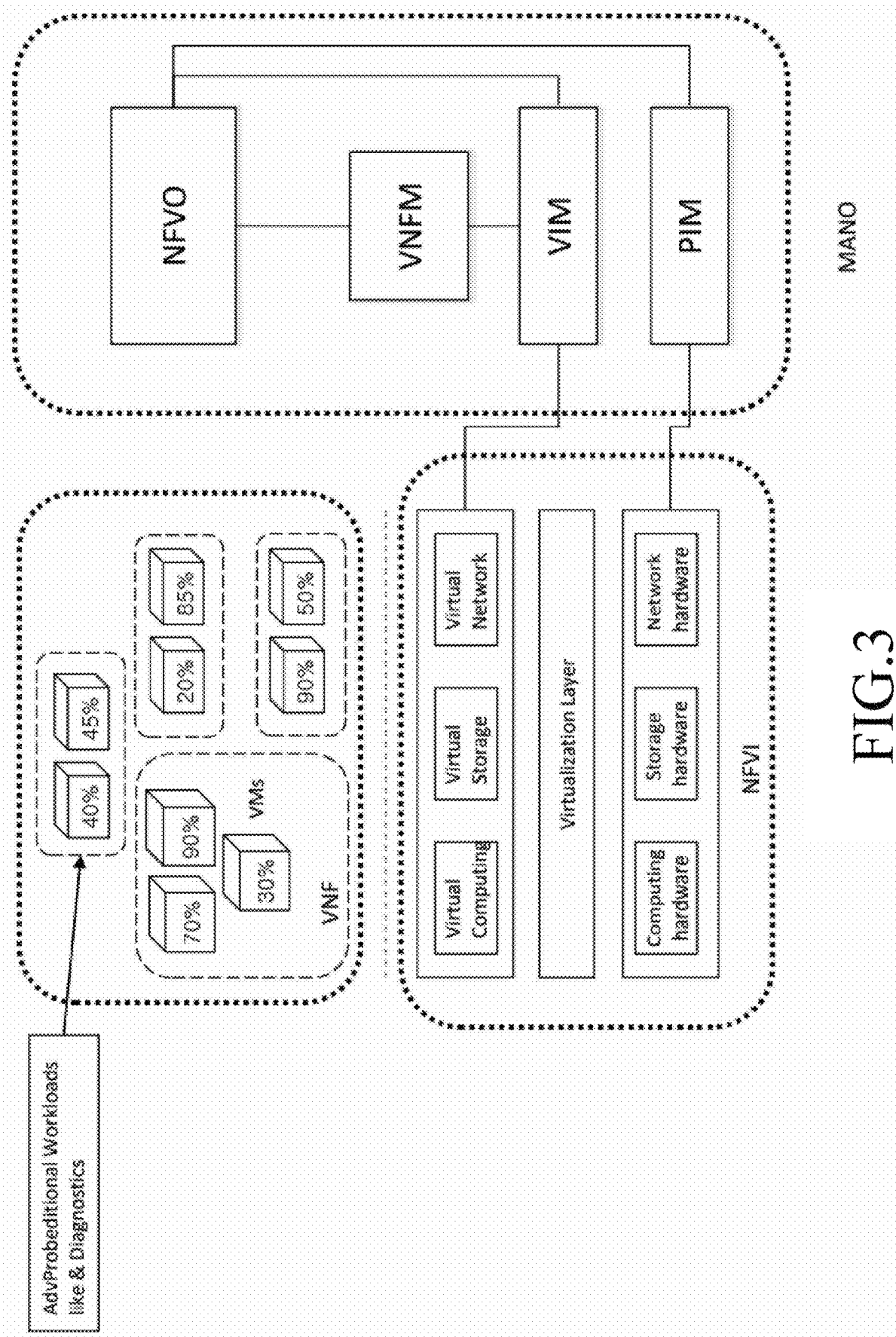
FIG. 3 illustrates an example of deployment of additional workload as per the state of the art technique.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of this disclosure. Furthermore, in terms of the construction of the device, one or more components of the device may have been represented in the drawings by conventional symbols, and the drawings may show only those specific details that are pertinent to understanding the embodiments of this disclosure so as not to obscure the drawings with details that will be readily apparent to those of ordinary skill in the art having benefit of the description herein.

DETAILED DESCRIPTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

It should be understood at the outset that although illustrative implementations of the embodiments of the present disclosure are illustrated below, this disclosure may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching and illuminating some embodiments and their specific features and elements and does not limit, restrict or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . ." or "one or more element is REQUIRED."

Unless otherwise defined, all terms, and especially any technical and/or scientific terms, used herein may be taken to have the same meaning as commonly understood by one having an ordinary skill in the art.

Embodiments of this disclosure will be described below in detail with reference to the accompanying drawings.

Figure 4:
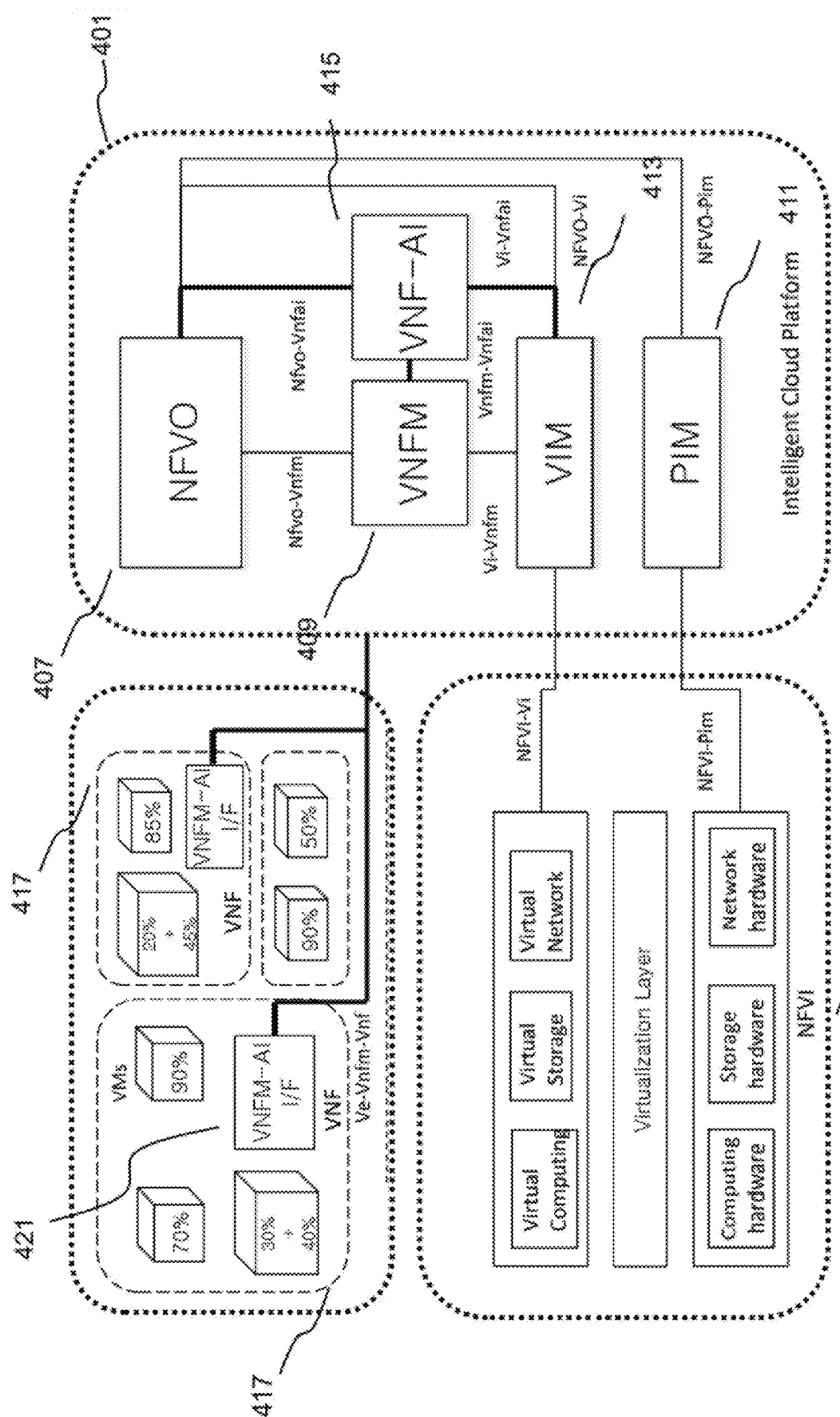
FIG. 4 illustrates an exemplary embodiment of Intelligent Cloud Platform 401, in accordance with certain embodiments of this disclosure.

FIG. 4 illustrates an exemplary embodiment of Intelligent Cloud Platform 401, in accordance with certain embodiments of this disclosure. The main components of the intelligent cloud platform 401 are: NFV Orchestrator (NFVO) 407; VNF Manager (VNFM) 409; Physical Infrastructure Monitor (PIM) 411; Virtual Infrastructure Manager (VIM) 413; and VNF-AI 415. The intelligent cloud platform 401 is operatively coupled with a cluster of VMs forming a part of VNF 417 and NFVI 419 via ve-vnfm-vnf and NFVI-Pim interfaces respectively. There can be multiple VNF rendered or acting as guest functions that are hosted in the intelligent cloud platform 401. For the sake of brevity only two VNFs 417 is shown. The VNFs uses physical and virtual resources if the NFVI. The main components of the NFVI comprises Virtual Computing, Virtual Storage, Virtual Network, a Virtualization layer which couples these virtual entities to corresponding hardware resources in the form of Computing Hardware, Storage Hardware and Network Hardware.

The following enumeration provides a key operation of the above-mentioned components illustrated in FIG. 4.

NFV Orchestrator (NFVO) 407 configured to manage on-boarding, initiation, and termination of a new VNF. It is also configured to perform global resource management, validation and authorization of NFVI 419.

VNF Manager (VNFM) 409 configured to manages life cycle, performance, and faults of the VNFs. It is also configured to perform overall coordination and adaptation role for configuration and event reporting between various components operating in a network.

Physical Infrastructure Monitor (PIM) 411 configured to collects and manages the performance and fault information from the physical servers.

Virtual Infrastructure Manager (VIM) 413 is configured to obtain information about each physical and virtual resource utilized by the VNFs through NFVI-Vi interface. The information includes, for example, CPU, memory, and network usages of the main workloads of the VNFs 413. This information is shared with the VIM through "usage report" REST API mentioned in OpenStack Compute node.

In addition to the above, certain embodiments of this disclosure deploy two components: a). Virtual Network Function Artificial Intelligence (VNFAI) 415; and b). VNFM-AI I/F 421, interface between VNFM 409 and VNF 417 to provide a mechanism that can efficiently forecast the under-utilized static resources and manages the deployment of the additional workloads with optimal resource utilization during lean period. These components assist VNFs to run efficiently when its resources are statically allocated.

As an example, the VNFAI 415 and the VNFM-AI I/F 421 may be implemented through an AI model. A function associated with AI may be performed through the non-volatile memory, the volatile memory, and the processor. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

Further, the AI model may comprise a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks. Furthermore, the learning technique is a method for training a predetermined target device (for example, a robot) using a plurality of learning data to cause, allow, or control the target device to make a determination or prediction. Examples of learning techniques include, but are not limited to, supervised learning, unsupervised learning, semi-supervised learning, or reinforcement learning.

In one embodiment of this disclosure, VNFAI 415 may be configured to forecast the resource utilization of a main workloads of the VNFs based on a predictive analysis criteria and the current resource utilization level of the one or more VNFs. It is also configured to determine whether the forecast future resource utilization for 'n' time period is less than a determined optimal resource utilization threshold value of the one or more VNFs and determine the said period as a lean workload period if the future resource utilization is less than said determined optimal resource utilization threshold value. The determined optimal resource utilization threshold value of the one or more VNFs may, be for example, CPU, memory, and network utilization and the like parameters. Based thereupon i.e. lean workload period the resources of the one or more VNFs are allocated to one or more additional workloads. As an example, the resource utilization may also includes historical data, time of a day, application specific time resources and the like in which resources are being utilized.

As an example, the predictive analysis criteria are defined by utilization of various techniques for workload forecasting. The various techniques for workload forecasting include various predictive models. For example, the predictive models may include second order autoregressive moving average method (ARMA) filter for the workload forecasting or ARIMA model. In this present disclosure the ARIMA model has been utilized for workload forecasting. A detailed mechanism of the AMNIA model has been explained in the forthcoming paragraph.

In another embodiment the VNFM-AI I/F 421 shares the lean workload period of the respective VMs to VNF 417 that runs ad-hoc additional workload that fits in the forecasted lean period. Based thereupon resources of the one or more VNFs are allocated to one or more additional workloads.

Figure 5:
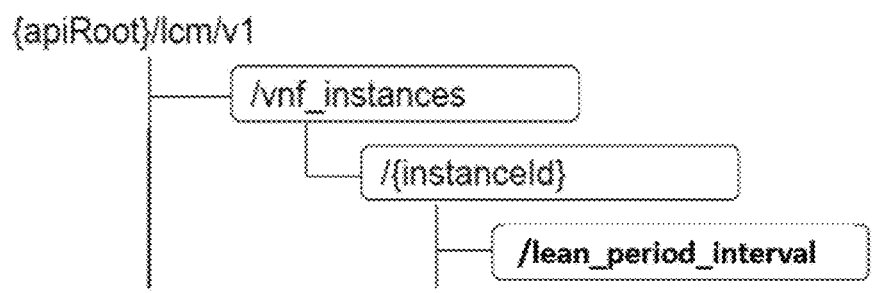
FIG. 5 illustrates an updated REST APIs used by VNFM to update VNFs in accordance with certain embodiments of this disclosure.

According to another embodiment of this disclosure, the VNFAI 415 may be configured to predict the lean workload period associated with resources consumed by a main workloads for each VNF 417. VNFAI 415 may be configured to be share the predicted lean work period to the VNF 417 through VNFM 409 and VNFM AI I/F 421 via vnfai-vnfm & ve-vnfm-vnf interfaces as shown in FIG. 4. Meanwhile the corresponding REST API are also updated as shown in FIG. 5. The REST API lean period interval helps to deliver current lean period in the VNFs 417. In order to determine the lean workload period from forecasted values, the determined optimal resource utilization threshold value is defined for CPU, memory, and network utilization. For example, consider that the optimal CPU utilization threshold is 80%. If the additional workload requires "x"% of CPU, then existing workload plus "x"% should be less than or equal to 80% for the optimal CPU Utilization. Now, if additional workload is to be deployed then system should have 1.2 GB+8.5% of additional workload memory. As for network utilization, if system has resources available in terms of CPU and memory then there should not be any constraints to use network to its peak capacity. If "y"% is the network capacity requirement of additional workload to be deployed, then lean workload period is identified when (100−y) % of network capacity is utilized by existing workload(s). However, for the stability of the system, consider overprovisioning guard factor as 5% for each of CPU, memory and network utilization. This is the strategy used for deciding optimal threshold limit. Thus, using VNFAI 415, the intelligent cloud platform 401 forecast resource utilization for next 'n' minutes when a VNF 417 thereby enabling the VNFs to use lean workload period ensuring that performance of existing application is not disturbed while running additional application.

In an alternate example, the Intelligent Cloud Platform 401 may include an intelligent scheduler based on at least one Artificial Intelligence (AI) model which may be configured to predict multiple lean period and schedule the deployment of additional workload multiple times based on the prediction.

According to yet another embodiment of this disclosure, VNFAI 415 utilizes statistical model, for example but not limited to, Auto-Regressive Integrated Moving Average (ARIMA) model to predict the resource utilization. As explained above, forecast of workload is required to estimate the lean period at VNF 417. To estimate the same, a time series forecasting model can be utilized. Seasonality and trend are the metrics of time series data that break the forecasting models. Trend is a continuous decrease or increase in time series that is not periodic. A time series with a trend is called non-stationary series. Seasonality is visible, when periodic pattern occurs in system. Seasonal pattern can repeat hourly, daily, weekly or repeat for much longer period. So, trend and seasonality are checked before choosing the time series model for forecasting. To reduce the effect of these metrics on times series data, ARIMA model can be used. ARIMA model comes from autoregressive (AR), moving average (MA) and the combination of AR and MA (ARMA) Models. Certain embodiments of this disclosure apply AR, MA and ARMA models only to stationary series but can apply ARIMA to non-stationary series as well. To overcome seasonality issues, SARIMA (Seasonal ARIMA) model can be used.

AR model: In the AR(p) model, the current value of time series is expressed as summation of 'p' previous values.

MA model: In MA(q) model, the current value of time series is expressed as summation of 'q' lagged errors.

ARMA model: In the ARMA(p,q) model, the current value of time series is expressed as summation of 'p' previous values and 'q' lagged errors.

ARIMA model: Unlike above models, ARIMA(p,d,q) model helps to convert a non-stationary series to stationary by introducing differencing process of order 'd'.

ARIMA model takes three parameters (p,d,q), where 'p' is autoregressive order in the model, 'd' is difference order required to make the time series stationary and 'q' is the moving average order. With above orders, ARIMA forecasted value 'y' at time T is given by the below equation 1.

$$y_t = \mu + y_{t-1} + \alpha_1 y_{t-1} + \alpha_2 y_{t-2} + \ldots + \alpha_p y_{t-p} + 1 + \beta e_{t-1} + \ldots + \beta e_{t-q} \quad (1)$$

Where, $\alpha$ is coefficient of lag,
e is error term,
$\beta$ is error coefficient, and
$\mu$ is intercept term.

VNFAI uses ARIMA model to forecast $y_t$ for CPU, memory, and network resources. Forecasted resources are used to identify the lean period.

Figure 6:
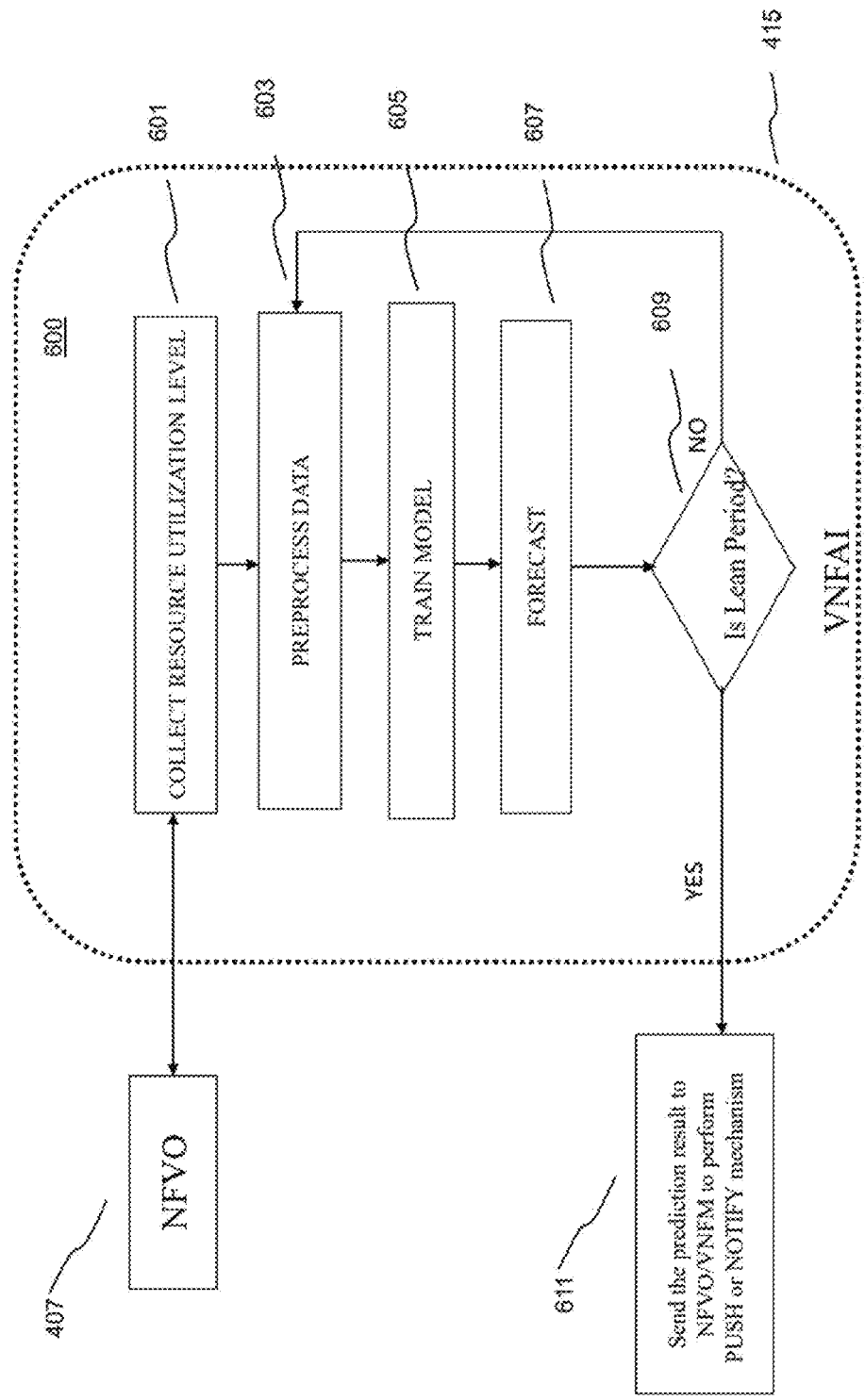
FIG. 6 illustrates a method of a ARIMA model for forecasting resource usage, in accordance with certain embodiments of this disclosure.

FIG. 6 illustrates a method of the ARIMA model for forecasting resource usage, in accordance with an embodiment of this disclosure. Description will be made by referring to FIG. 4. The method 600 is implemented in the VNFAI 415 for forecasting resource utilization as a main workload for one or more VNFs 417 or additional workload.

The method 600 comprises collecting (step 601), from the NFVO 407 via Nfro-Vnfai interface, a current resource utilization level of the one or more VNFs 417 for particular time period; i.e., 'n'.

Thereafter, the method 600 comprises pre-processing (step 603) the collected current utilization level of resources of the one or more VNFs 417, resulting in normalized data for facilitating machine-learning. As an example, the resource utilization may also includes historical data, time of a day, application specific time resources and the like in which resources are being utilized.

The method 600 comprises training (step 605) the collected current utilization level of resources of the one or more VNFs 417 to obtain the normalized data based on the pre-processed current resource utilization level of the one or more VNFs. In an example, the AI model or machine learning or deep learning model may be trained based on training dataset corresponding to utilization of resources and a prediction loss may be predicted based on a target dataset to thereby adjust the weights of the deep learning model and fine tune the settings. Here, being provided through learning means that, by applying a learning technique to a plurality of learning data, a predefined operating rule or AI model of a desired characteristic is made. The learning may be performed in a device itself in which AI according to an embodiment is performed, and/or may be implemented through a separate server/system.

The method 600 comprises forecasting (step 607) future resource utilization on the one or more VNFs 416 during an inference stage or real-time operation. During the inference stage, the normalized data as achieved by pre-processing may be converted into a feature map which may be thereafter processed by the AI model or the machine learning model to draw predictions such as the lean period.

The method 600 further determines a lean period based on the forecasted resource utilization on the one or more VNFs 416.

If it is determined (Step 611) that lean period going to occur, then send the prediction result to NVFO 407 to implement either PUSH mechanism or send prediction result to VNFM 409 to implement NOTIYFY mechanism for the deployment of the additional workload in the forecasted lean period. The NOTIYFY or PUSH mechanism will be discussed in detail in the forthcoming section.

Elsewise, the method 600 will move to perform pre-processing (step 603).

Figure 7:
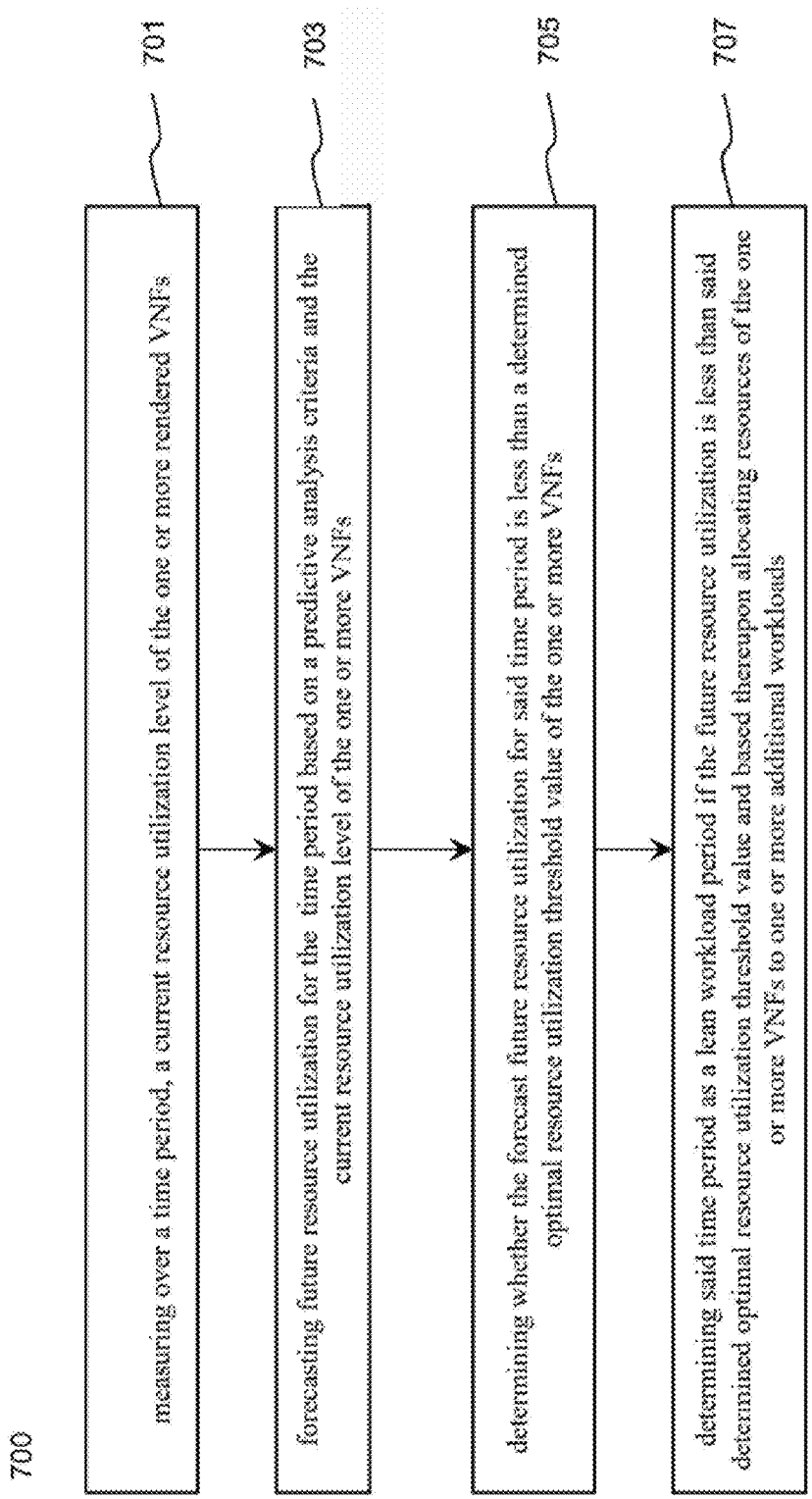
FIG. 7 illustrates a method for implementing resource optimization in a Network Function Virtualization Management and Network Orchestration (NFV-MANO) operating on a cloud platform for enabling deployment of additional workload, in accordance with certain embodiments of this disclosure.

FIG. 7 illustrates a method for implementing resource optimization in a Network Function Virtualization Management and Network Orchestration (NFV-MANO) operating on a cloud platform for enabling deployment of additional workload, in accordance with this disclosure. The method 700 may be implemented in a cloud-based environment in a NFV-MANO as shown in FIG. 4.

The method 700 initially measures (Step 701) a current resource utilization level of the one or more rendered VNFs over a time period. The Step 701 is implemented at the VIM 413. As an example, the there can be multiple VNFs rendered as hosted in the intelligent cloud platform 401 but of the sake of brevity only two VNFs 417 is shown in FIG. 4. The rendering of VNFs may be construed to cover hosting of VNFs by the intelligent cloud platform 401, wherein the VNFs act as guests as a part of virtualization.

Thereafter, method 700 comprises forecasting (Step 703) future resource utilization for the time period based on a predictive analysis criterion and the current resource utilization level of the one or more VNFs. The predictive analysis may be performed based on ARIMA model as explained above in FIG. 6. The Step 703 is implemented at the VNFAI 415.

Thereafter, method 700 comprises determining (Step 705) whether the forecast future resource utilization for said time period is less than a determined optimal resource utilization threshold value of the one or more VNFs. The Step 705 is implemented at the VNFAI 415.

Then, method 700 comprises determining (Step 707) said time period as a lean workload period if the future resource utilization is less than said determined optimal resource utilization threshold value and based thereupon allocating resources of the one or more VNFs to one or more additional workloads. The Step 707 is implemented at the VNFAI 415.

According to yet another embodiment of this disclosure, the method 700 further comprises estimating a resource utilization by the additional workload. According, to one implementation the allocation of the additional workloads is based on the lean workload period of the one or more VNFs as explained above and based on the estimated resource utilization by the additional workload.

In another exemplary embodiment of the present this disclosure, an Intelligent cloud platform is designed to deploy additional workload in the forecasted lean period in two different ways. First, it can push workload from NFVO to VNFs. This mechanism is referred in this disclosure as PUSH mechanism. Second, VNF can subscribe to NFVO for lean period interval notification. This mechanism is referred in this disclosure as NOTIFY mechanism. The NOTIFY and PUSH mechanism will be discussed in detail below.

Figure 8:
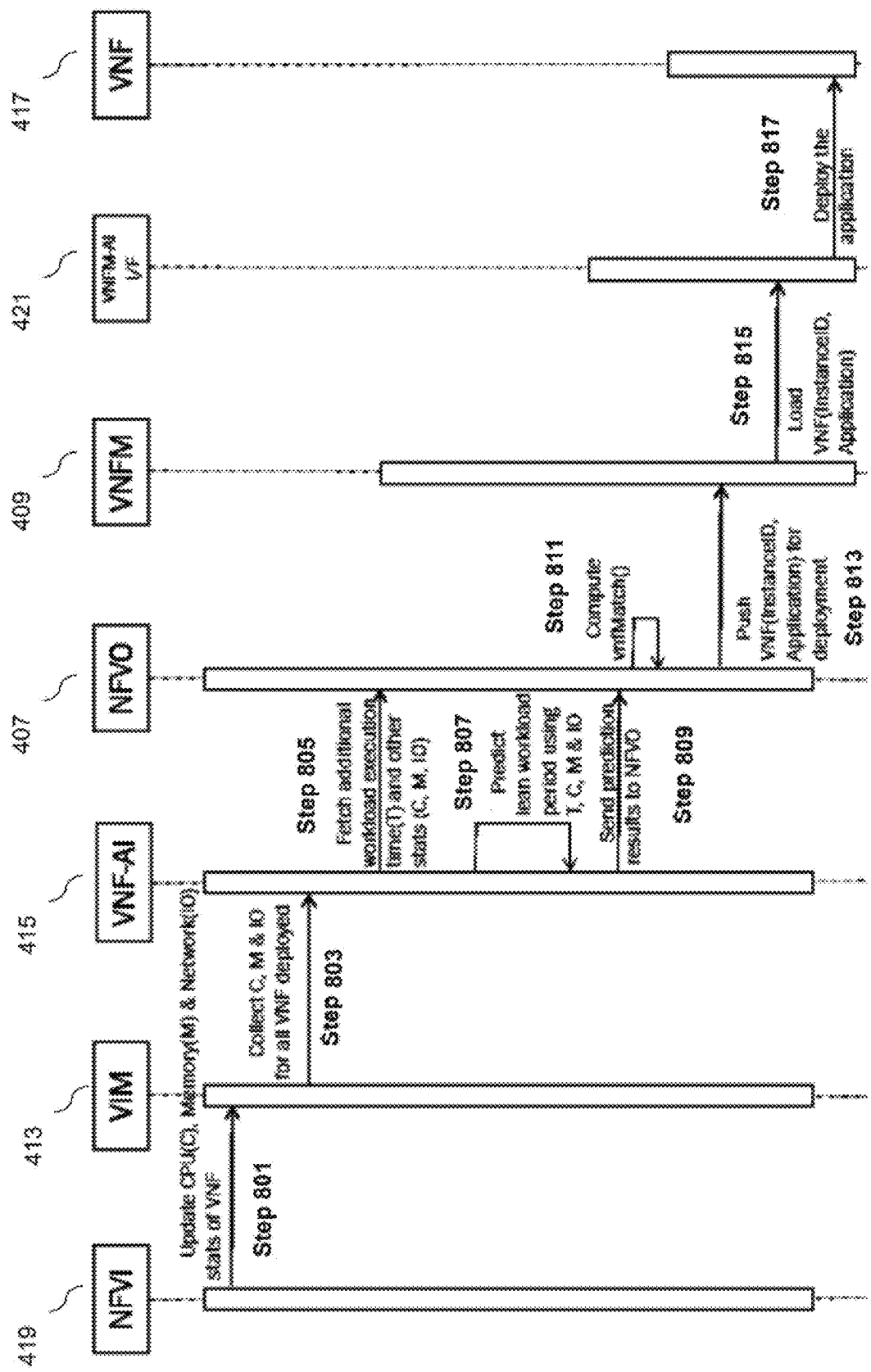
FIG. 8 illustrates the PUSH mechanism implemented by the intelligent cloud platform for the deployment of the additional workloads or ad-hoc workloads, in accordance with certain embodiments of this disclosure.

FIG. 8 illustrates the PUSH mechanism implemented by the intelligent cloud platform for the deployment of the additional workloads or ad-hoc workloads workload, in accordance with this disclosure. The ad-hoc workloads are pre-loaded in the intelligent cloud platform along with the resource dimensioning parameters. The explanation will be made by referring to FIG. 4. The sequence of operation for employing PUSH mechanism implemented by the intelligent cloud platform 401 for the deployment of the additional workloads or ad-hoc workloads workload are as follows.

Initially at step 801, VIM 413 receives updates about CPU, Memory, Network states of each of the VNFs 417 from the NFVI 419. The VIM 413 also measures the current resource utilization level of the one or more rendered VNFs over a time period.

Thereafter, at step 803 the VNF-AI 415 collects the states of the CPU, Memory, Network of each of the VNFs 417. In particular, The VNF-AI 415 collects resource usage data using REST-API exposed by the intelligent cloud platform to generate a deployability log of the additional workload.

Then, at step 805, the VNF-AI 415 fetches the additional workload execution time (T) and other states of the CPU, MEMORY and Network information of the VNFs from the NFVO 407 for estimating resource utilization by the additional work load.

Meanwhile, at step 807, The VNF-AI 415 predict a lean workload period for all the corresponding VNFs by performing mechanism at steps 703, 705 and 707 as explained in FIG. 7 above.

Thereafter, at step 809, the VNF-AI 415 sends the prediction results to the NFVO 407 for further processing of deployment of the additional workload.

At step 811 the NFVO 407 performs mapping of the additional workload to all the VNFs based on the corresponding predicted lean workload period and determining whether the additional workload is deployable or not in the VNFs to generate the deployability log as shown in table 1 below. An additional workload is deployable to a VNF based on a condition that if the sum of resource required for the new workload and the resource prediction of the VNF does not exceed the determined optimal resource utilization threshold value for the VNF. For example, the above conditions may be expressed as:

1. $CPU_{vnf\_workload}$ + $CPU_{adhoc\_workload}$ < $CPU_{threshold}$
2. $Memory_{vnf\_workload}$ + $Memory_{adhoc\_workload}$ < $Memory_{threshold}$
3. $NetworkI/O_{vnf\_workload}$ + $NetworkI/O_{adhoc\_workload}$ < $NetworkI/O_{threshold}$ For doing the deployment of the additional workload 'Maximum Bipartite Matching' technique is utilized to schedule the additional workloads to the VNFs.

TABLE 1

DEPLOYABILITY LOG

| | workload$_1$ | workload$_2$ | workload$_3$ |
|---|---|---|---|
| vnf$_1$ | 1 | 0 | 1 |
| vnf$_2$ | 0 | 1 | 0 |
| vnf$_3$ | 1 | 1 | 0 |
| vnf$_4$ | 0 | 0 | 0 |

At step 813 the NFVO 407 pushes the additional workloads to the VNFs based on a result of scheduling. In particular, the NFVO 407 pushes the InstanceID and Application of the additional workloads to the VNFM 409. For example, the match result will be match[1,2,3]=[3,2,1]. The above table 1 may be valid for a single prediction and may be calculated repeatedly for every forecast of the VNFs resource usage. Now, if the workload$_i$ is to be deployed to vnf$_j$, the workload will be loaded to the VNF 417 through VNFM 409 and VNFM-AI I/F REST APIs with the VNFC instanceID and the ad-hoc workload Application.

At step 815, the VNFM 409 loads the InstanceID and Application of the additional workloads to the VNFM-AI I/F 421.

Thereafter, at step 817, the VNFM-AI I/F 421 started deploying the additional workload in the corresponding VNFs through VNFM and VNF-AI I/F REST APIs. Thus, this mechanism maximises the number of additional workloads deployed.

Figure 9:
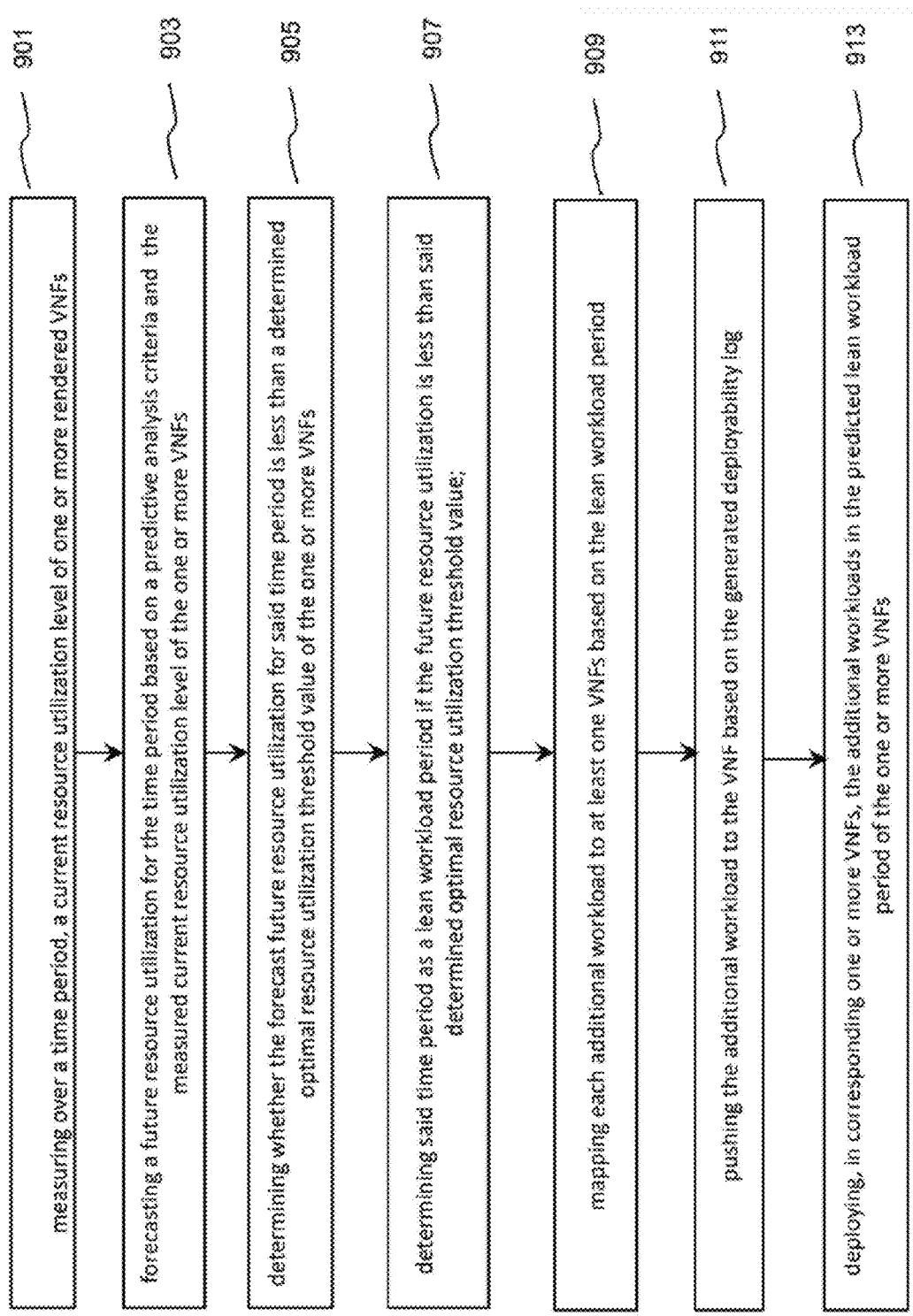
FIG. 9 illustrates a flow chart of the PUSH mechanism implemented by the intelligent cloud platform for the deployment of the additional workloads or ad-hoc workloads, in accordance with certain embodiments of this disclosure.

FIG. 9 illustrates a flow chart of the PUSH mechanism implemented by the intelligent cloud platform for the deployment of the additional workloads or ad-hoc workloads, in accordance with this disclosure. The mechanism at the blocks 901-907 is similar to the mechanism at the 701-707 of the FIG. 7 as explained above. Further, the mechanism at blocks 909-913 is similar to the mechanism perform at steps 811-817 of the FIG. 8 as explained above. Therefore, for the sake of brevity the same has been omitted here.

Figure 10:
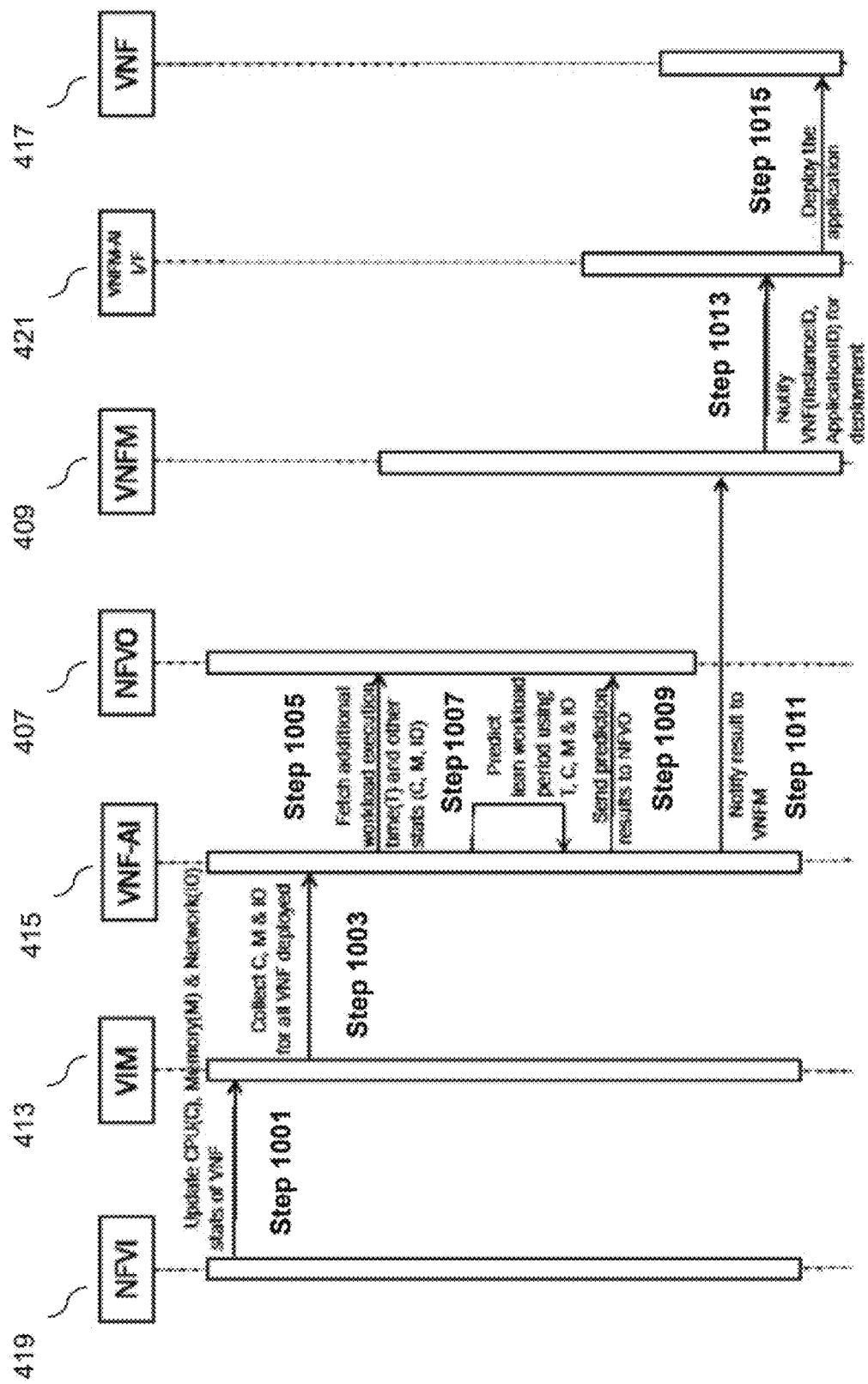
FIG. 10 illustrates the NOTIFY mechanism implemented by the intelligent cloud platform for the deployment of the additional workloads or ad-hoc workloads, in accordance with certain embodiments of this disclosure.

FIG. 10 illustrates the NOTIFY mechanism implemented by the intelligent cloud platform for the deployment of the additional workloads or ad-hoc workloads, in accordance with this disclosure. The explanation will be made by referring to FIG. 4. The sequence of operation for employing NOTIFY mechanism implemented by the intelligent cloud platform for the deployment of the additional workloads or ad-hoc workloads are as follows:

In an implementation the sequence of mechanism at steps 1001-1009 are similar to the steps at 801-809 of PUSH mechanism as explained in FIG. 8. Therefore, for the sake of brevity the description of the same has been omitted here.

There may be cases where an additional workload should be deployed to a particular VNF, for example, a Diagnostics application will have to retrieve statistics from a particular VNF. For example, a diagnostic application associated with a DB service needs to be run in the VNF where there is a critical alarm. This approach will help in such VNF specific deployment. The ad-hoc workloads are pre-loaded with the main workloads of the VNFs during deployment. These workloads however are not started along with the primary workloads of the VNFs. The VNFM-AI I/F runs a listener which will be subscribed to the VNF-AI notifications through VNFM REST API. The VNF-AI 415 will provide notifications (step 1011) whenever it predicts a VNF with the lean period for the given additional workloads. Each prediction result will be notified, by the VNF-AI 415, to the VNFM 409 which will further notify as a notification message (step 1013) to the VNF-AI I/F regarding the corresponding subscribed VNF with InstanceID and ApplicationID. The VNF-AI I/F, after receiving this notification, verifies if the ad-hoc workload is deployable and triggers or start (step 1015). the preloaded additional workloads along with the main workload upon receiving a notification message indicating the predicted lean period of the corresponding VNF in the VNF 417. Thereafter, the VNF will start deploying the additional workload in the particular VNFs.

Figure 11:
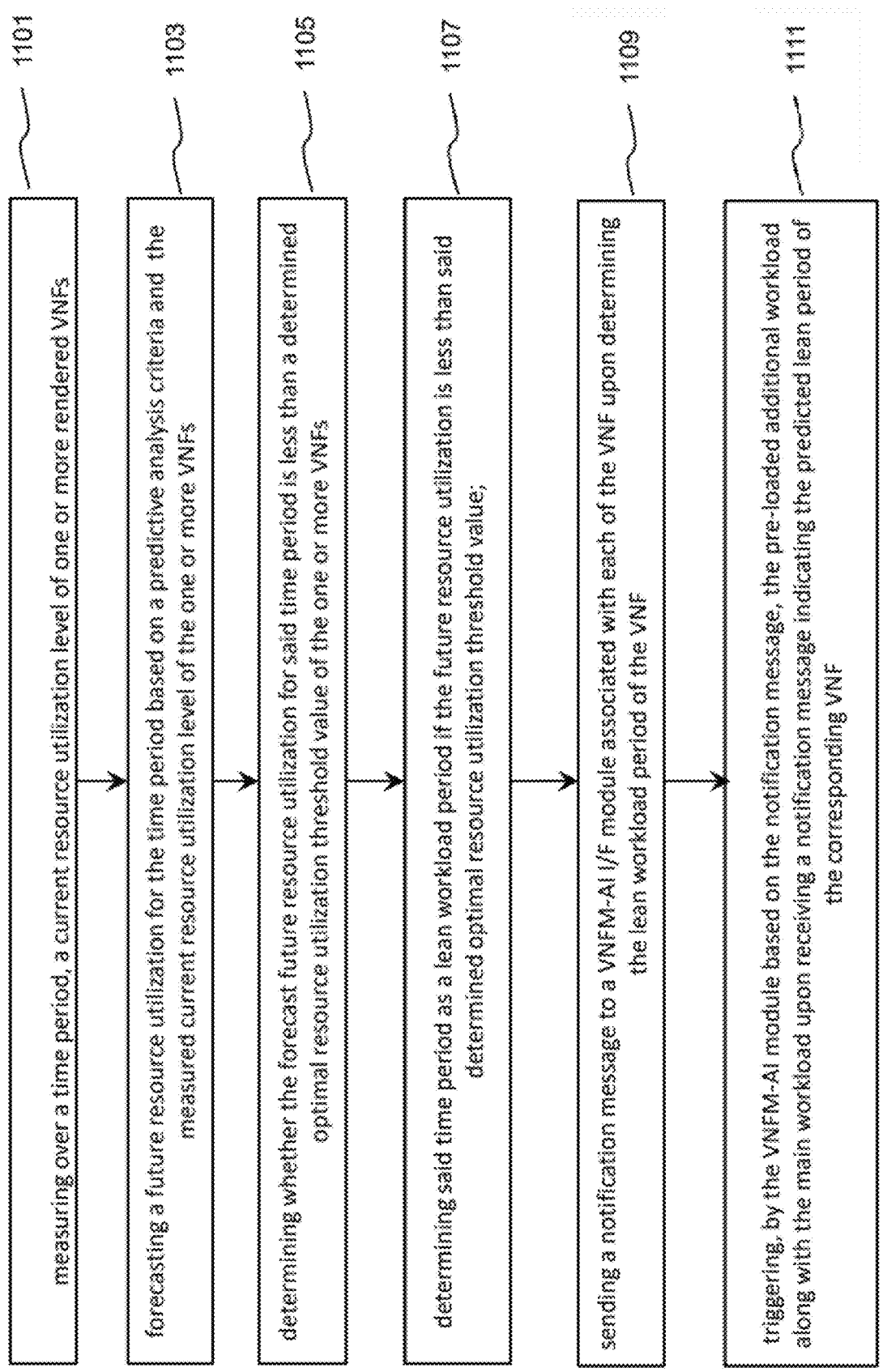
FIG. 11 illustrates a flow chart of the NOTIFY mechanism implemented by the intelligent cloud platform for the deployment of the additional workloads or ad-hoc workloads, in accordance with certain embodiments of this disclosure.
Figure 12:
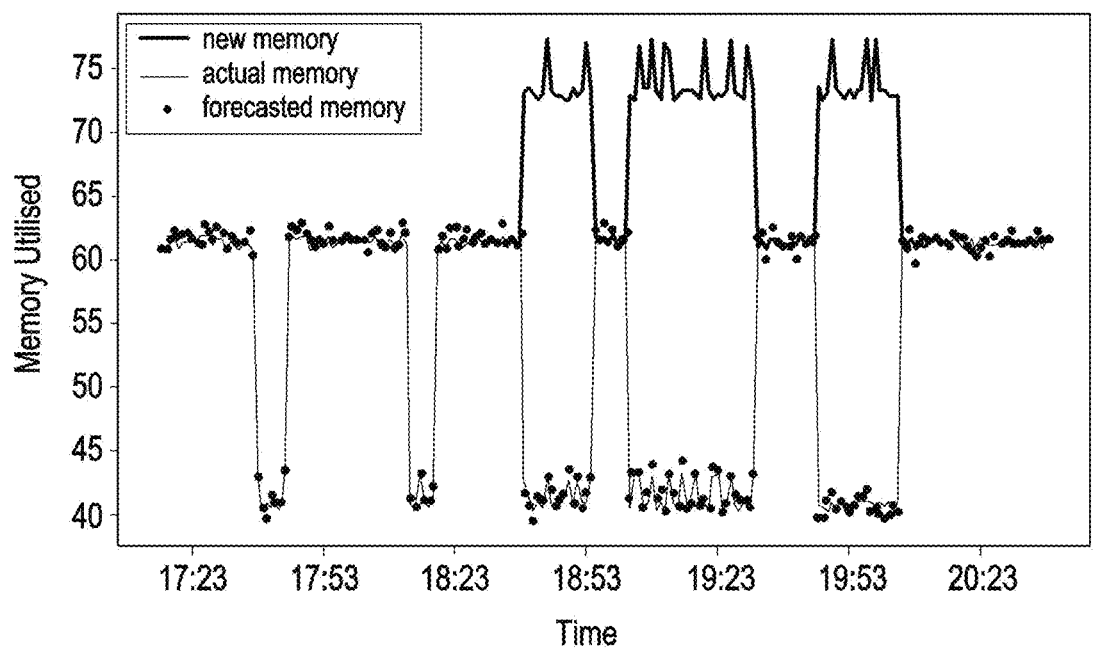
FIGS. 12-15 illustrates the experimental results of the proposed intelligent cloud platform, in accordance with certain embodiments of this disclosure.
Figure 13:
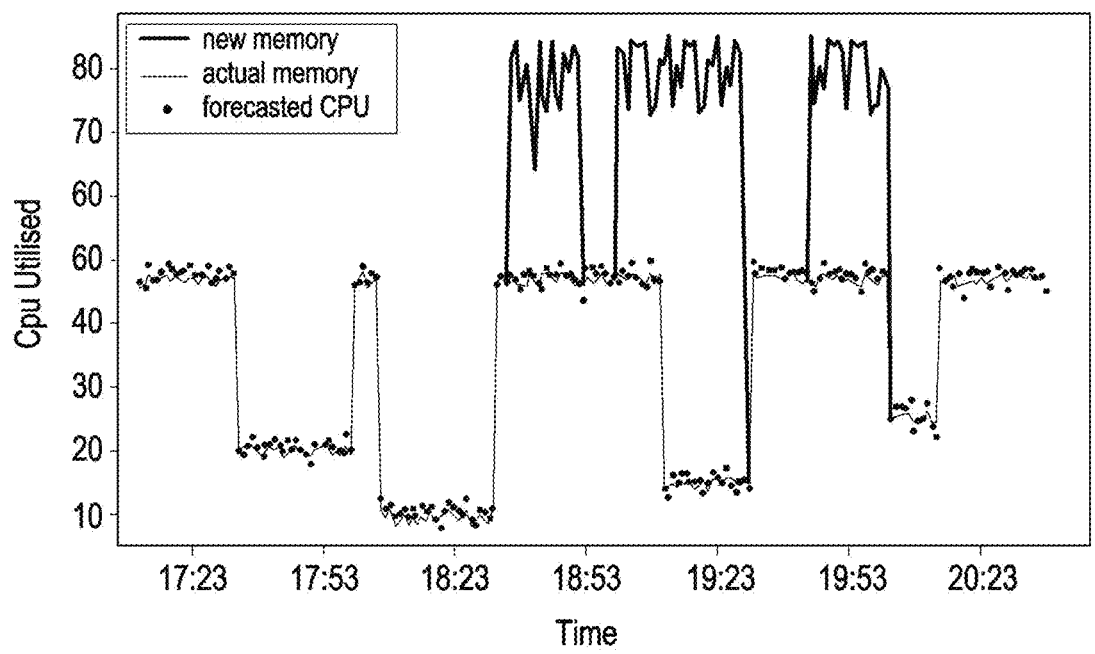
Figure 14:
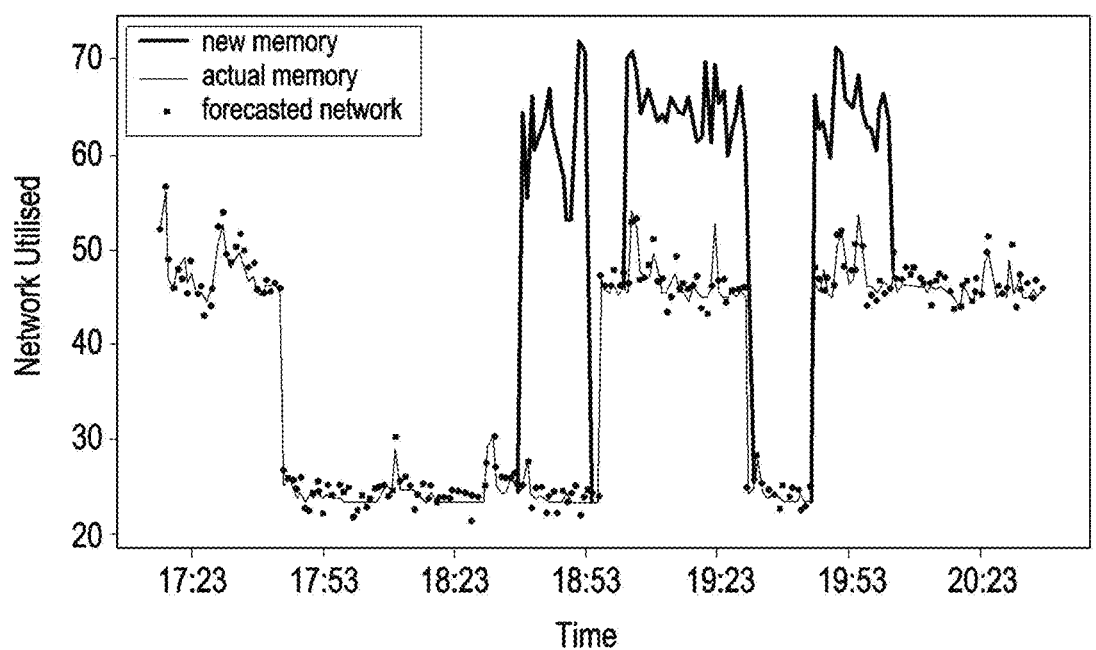
Figure 15:
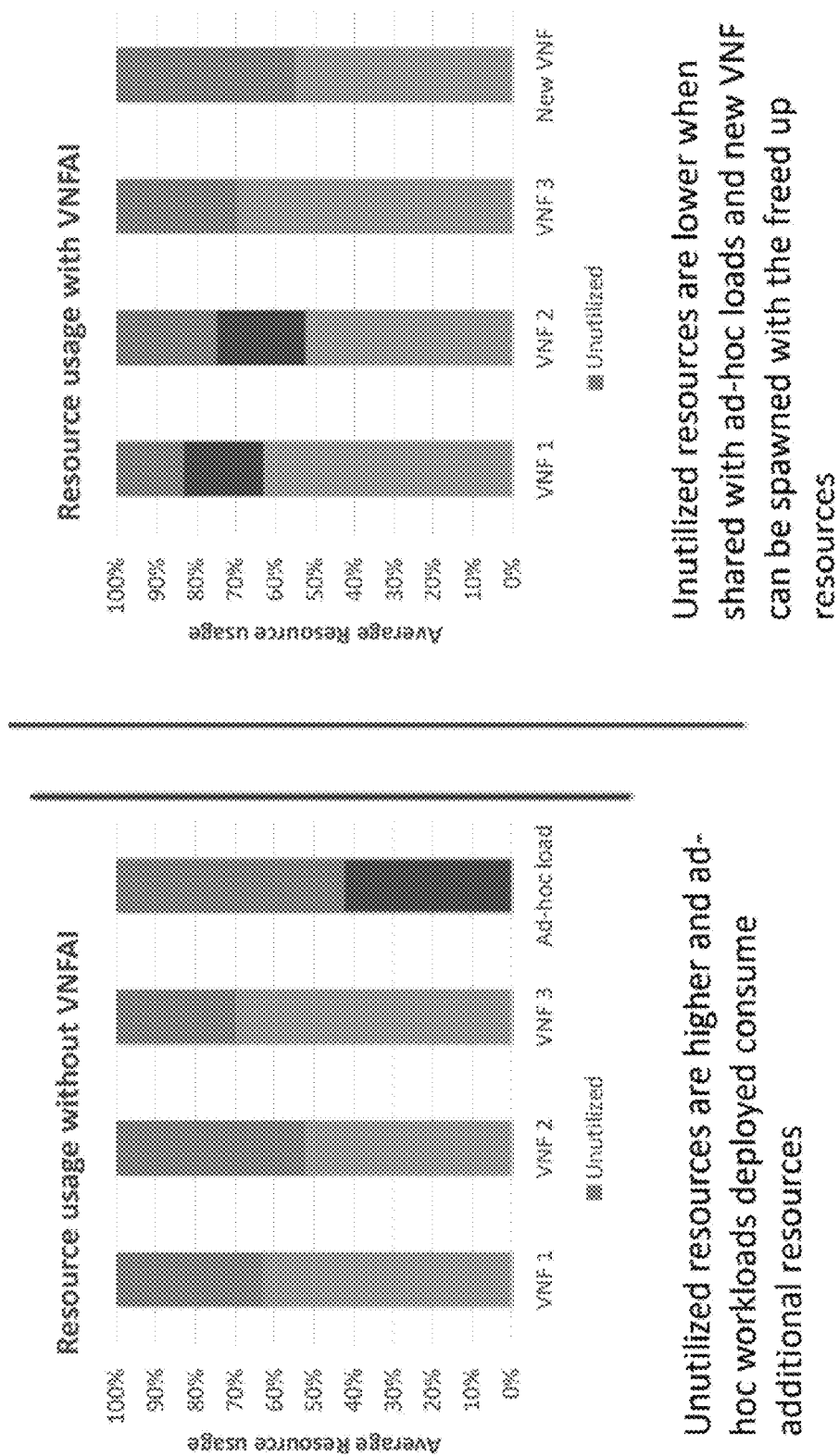

FIG. 11 illustrates a flow chart of the NOTIFY mechanism implemented by the intelligent cloud platform for the deployment of the additional workloads or ad-hoc workloads, in accordance with this disclosure. The mechanism at the blocks 1101-1107 are similar to the mechanism at the 701-707 of the FIG. 7 as explained above. Further, the mechanism at blocks 1109-111 are similar to the mechanism perform at steps 1013-1015 of the FIG. 10 as explained above. Therefore, for the sake of brevity the same has been omitted here.

FIGS. 12-15 shows the experimental results of the proposed intelligent cloud platform, in accordance with this disclosure. The experimental results show that the proposed intelligent cloud platform is able to forecast CPU, memory and network utilization with an accuracy of 95.4%,93.7% and 96.2% respectively. Further, table II depicts a comparison of the existing platform with respect to the proposed Platform. It can be seen that from table II, according to this disclosure, VNFs are able to run additional workload during lean period with average CPU, memory, and network utilization improved by 38%, 19%, and 20% respectively.

TABLE II

AVERAGE RESOURCE UTILIZATION.

| | Existing Platform | Proposed Platform | Improved Resource Utilization (%) |
|---|---|---|---|
| CPU | 32.4% | 44.8% | 38% |
| Memory | 53.4% | 63.9% | 19% |
| Network | 37.1% | 44.6% | 20% |

Thus, from the above it can be summarized that the present intelligent cloud platform offers following technical effects:

Reduce in additional resource usage.

The resource utilization will be optimal since the under-utilized resources during lean periods are being assigned for ad-hoc applications.

By employing the present method of this disclosure, a network operator is able to use the saved resources for deploying new VNFs which results in higher profitability.

PUSH mechanism or NOTIFY mechanism provides a flexibility to a network operator to use either of the mechanism according to the requirement.

Various additional workloads like Network Element Software Manager, User Manager, Statistics retrieval, etc., can be run without additional cost for the operators.

It reduces the CAPEX and OPEX cost of the cloud platform.

Figure 16:
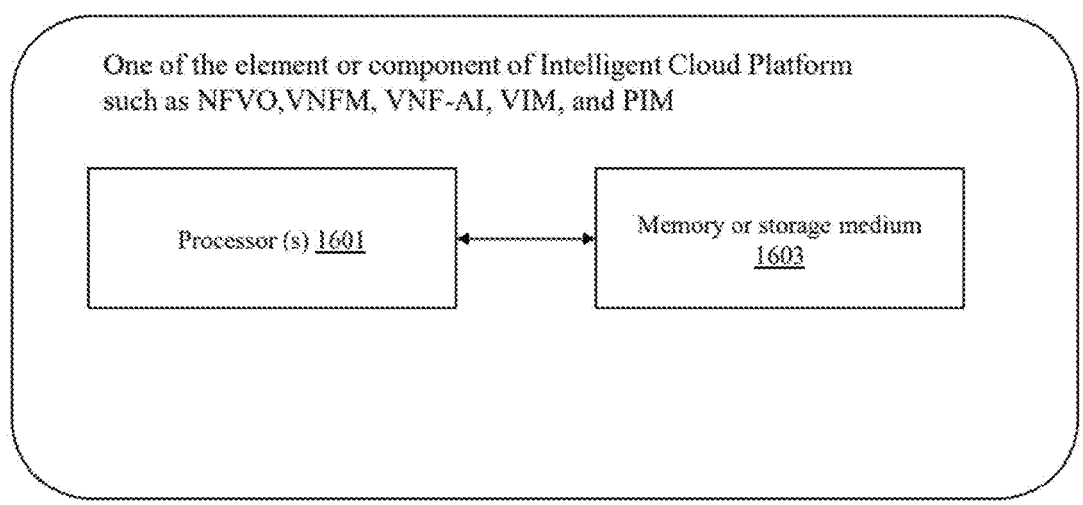
FIG. 16 illustrates another system architecture implementing various modules, sub-modules or functional units, in accordance with certain embodiments of this disclosure.

As has been described, a system and/or method are provided for VNF-NFVI synchronization configuration, with and without the help of the VNFM, based on ETSI NFV standard. The functional units or modules or submodules, as described in FIG. 4, and may be realized in any appropriate combination of hardware and/or software. The units may comprise one or more processors 1601 and memory or storage medium 1603 and may be integrated to any degree as shown in FIG. 16. The functional units may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may include a microprocessor, as well as any conventional processor, controller, microcontroller, or state machine. The functional units may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the functional units are for illustration and other suitable configurations within the scope of the present disclosure are also contemplated.

The storage medium or memory 1603 may represent one or more computer-readable, machine-readable, and/or processor-readable devices for storing programming, such as processor executable code or instructions (e.g., software, firmware), electronic data, databases, or other digital information. The storage medium may also be used for storing data that is manipulated by the processor 1601 when executing programming. The storage medium may be any available media that can be accessed by a general purpose or special purpose processor, including portable or fixed storage devices, optical storage devices, and various other mediums capable of storing, containing and/or carrying programming. By way of example and not limitation, the storage medium may include a computer-readable, machine-readable, and/or processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of resource optimization in a Network Function Virtualization Management and Network Orchestration (NFV-MANO) comprising:
measuring, over a time period, a current resource utilization level of one or more Virtual Network Functions (VNFs), each VNF comprising a cluster of multiple virtual machines;
forecasting a future resource utilization of the one or more VNFs based on a predictive analysis criteria and the current resource utilization level of the one or more VNFs;
determining whether the forecasted future resource utilization of the one or more VNFs is less than an optimal resource utilization threshold value of the one or more VNFs; and
allocating resources of the one or more VNFs to one or more additional workloads based on determining that the forecasted future resource utilization is less than the optimal resource utilization threshold value,
wherein the allocating of the resources of the one or more VNFs to the one or more additional workloads comprises:
sending a notification message to a VNF Manager-Artificial Intelligent (VNFM-AI) interface (I/F) module associated with each of the one or more VNFs upon predicting a lean workload time period for an additional workload that is allocated the resources of a corresponding VNF, wherein the notification message comprises the predicted lean workload time period, instance ID and application ID of the corresponding VNF, and the additional workloads are pre-loaded in the corresponding VNF along with a main workload; and
triggering, by the VNFM-AI I/F module based on the notification message, the pre-loaded additional workloads along with the main workload upon receiving the notification message.

2. The method of claim 1, wherein the forecasting of the future resource utilization of the one or more VNFs is based on at least one statistical model, wherein the resources are defined by at least one of: a CPU, a memory, or a network undergoing utilization as a main workload for the one or more VNFs or as the one or more additional workloads.

3. The method of claim 2, wherein the forecasting of the future resource utilization of the one or more VNFs further comprises:
collecting the current resource utilization level of the one or more VNFs;
pre-processing the collected current utilization level of resources of the one or more VNFs to obtain normalized data for facilitating machine-learning; and
training the statistical model based on the pre-processed current resource utilization level of the one or more VNFs for enabling forecast the future resource utilization on the one or more VNFs during an inference stage.

4. The method of claim 1, further comprising:
determining existence of one or more lean workload time period with respect to the one or more VNFs based on determining that the forecasted future resource utilization is less than the optimal resource utilization threshold value.

5. The method of claim 4, further comprising:
estimating a resource utilization by each additional workload among the one or more additional workloads, wherein the allocating of the resources of the one or more VNFs to the one or more additional workloads is based on the one or more lean workload time period of the one or more VNFs and the resource utilization by each additional workload among the one or more additional workloads,
wherein prediction of the one or more lean workload time period is associated with resources consumed by a main workload of the one or more VNFs.

6. The method of claim 5, wherein the allocating of the resources of the one or more VNFs to the one or more additional workloads comprises:
mapping each additional workload among the one or more additional workloads to at least one VNF among the one or more VNFs based on the one or more associated predicted lean workload time period;
generating a deployability log based on each mapped additional workload; and
pushing each mapped additional workload to the at least one VNF to which the mapped additional workload is mapped based on the generated deployability log.

7. An apparatus for resource optimization in a Network Function Virtualization Management and Network Orchestration (NFV-MANO) comprising one or more processors operatively coupled with a memory, wherein the one or more processors is configured to:
measure, over a time period, a current resource utilization level of one or more Virtual Network Functions (VNFs), each VNF comprising a cluster of multiple virtual machines;
forecast future resource utilization of the one or more VNFs based on a predictive analysis criteria and the current resource utilization level of the one or more VNFs;
determine whether the forecasted future resource utilization of the one or more VNFs is less than an optimal resource utilization threshold value of the one or more VNFs; and
allocate resources of the one or more VNFs to one or more additional workloads based on determining that the forecasted future resource utilization of the one or more VNFs is less than the optimal resource utilization threshold value,
wherein the one or more processor is further configured to:
send a notification message to a VNF Manager-Artificial Intelligent (VNFM-AI) interface (I/F) module associated with each of the one or more VNFs upon predicting a lean workload time period for an additional workload that is allocated the resources for a corresponding VNF, wherein the notification message comprises the predicted lean workload time period, instance ID and application ID of the corresponding VNF, and the additional workloads are pre-loaded in the corresponding VNF along with a main workload; and
trigger, by the VNFM-AI I/F module based on the notification message, the pre-loaded additional workloads along with the main workload upon receiving the notification message.

8. The apparatus of claim 7, wherein the future resource utilization of the one or more VNFs is based on at least one statistical model; and
wherein the resources are defined by at least one of: a CPU, a memory, or a network undergoing utilization as a main workload for the one or more VNFs or as the one or more additional workloads.

9. The apparatus of claim 8, wherein the one or more processors is further configured to:
collect the current resource utilization level of the one or more VNFs;
pre-process the collected current utilization level of resources of the one or more VNFs to obtain normalized data for facilitating machine-learning; and
train the statistical model based on the pre-processed current resource utilization level of the one or more VNFs for enabling forecast of the future resource utilization on the one or more VNFs during an inference stage.

10. The apparatus of claim 7, wherein the one or more processors is further configured to:
determine existence of one or more lean workload time period with respect to the one or more VNFs based on determining that the determined future resource utilization is less than the optimal resource utilization threshold value.

11. The apparatus of claim 10, wherein the one or more processors is further configured to:
estimate a resource utilization by each respective additional workload among the one or more additional workloads, wherein the allocation of the resources of the one or more VNFs to the one or more additional workloads is based on the one or more lean workload time period of the one or more VNFs and the resource utilization by each respective additional workload among the one or more additional workloads, and
wherein prediction of the one or more lean workload time period is associated with resources consumed by a main workload of the one or more VNFs.

12. The apparatus of claim 11, wherein the one or more processors is further configured to:
map each additional workload among the one or more additional workloads to at least one VNF based on the one or more associated predicted lean workload time period;
generate a deployability log based on each of the mapped additional workloads; and
push each mapped additional workload to the at least one VNF to which the mapped additional workload is mapped based on the generated deployability log.

* * * * *